(12) United States Patent
Mortensen et al.

(10) Patent No.: US 11,059,010 B2
(45) Date of Patent: Jul. 13, 2021

(54) INDUCTION HEATED REACTOR

(71) Applicant: HALDOR TOPSØE A/S, Kgs. Lyngby (DK)

(72) Inventors: Peter Mølgaard Mortensen, Roskilde (DK); Poul Erik Højlund Nielsen, Fredensborg (DK); Kim Aasberg-Petersen, Allerød (DK); Martin Østberg, Tune (DK)

(73) Assignee: HALDOR TOPSØE A/SE, Kgs. Lyngby (DK)

( * ) Notice: Subject to any disclaimer, the term of this patent is extended or adjusted under 35 U.S.C. 154(b) by 144 days.

(21) Appl. No.: 16/095,725

(22) PCT Filed: Mar. 28, 2017

(86) PCT No.: PCT/EP2017/057240
§ 371 (c)(1),
(2) Date: Oct. 23, 2018

(87) PCT Pub. No.: WO2017/186437
PCT Pub. Date: Nov. 2, 2017

(65) Prior Publication Data
US 2020/0330944 A1 Oct. 22, 2020

(30) Foreign Application Priority Data
Apr. 26, 2016 (DK) .......................... PA 2016 00247

(51) Int. Cl.
*B01J 8/06* (2006.01)
*B01J 8/02* (2006.01)
*B01J 12/00* (2006.01)

(52) U.S. Cl.
CPC .............. *B01J 8/067* (2013.01); *B01J 8/025* (2013.01); *B01J 12/007* (2013.01); *B01J 2208/00203* (2013.01)

(58) Field of Classification Search
CPC . B01J 8/067; B01J 8/065; B01J 8/0285; B01J 8/0496; B01J 8/025; B01J 8/0465;
(Continued)

(56) References Cited

U.S. PATENT DOCUMENTS

| 2,243,423 A | 5/1941 | Lee | |
|---|---|---|---|
| 2,406,640 A * | 8/1946 | Siecke | C10G 9/24 208/165 |

(Continued)

FOREIGN PATENT DOCUMENTS

| EP | 1480740 A1 | 12/2004 |
|---|---|---|
| WO | 9901212 A1 | 1/1999 |
| WO | 2009050631 A1 | 4/2009 |

OTHER PUBLICATIONS

Danish Search Report dated Nov. 29, 2016, by the Danish Patent Office for corresponding Danish Application No. PA 2016 00247.
(Continued)

*Primary Examiner* — Lessanework Seifu
(74) *Attorney, Agent, or Firm* — Buchanan Ingersoll & Rooney P.C.

(57) ABSTRACT

A tube heat exchange reactor for carrying out an endothermic catalytic reaction. The tube heat exchange reactor includes: an outer tube with a first and a second end, where the first end is an inlet end and where the second end is a closed end, an inner tube coaxially arranged within the outer tube and spaced apart from the outer tube, where at least a part of the inner tube holds a bed of catalyst material susceptible for induction heating and where the inner tube has an inlet end and an outlet end, an induction coil placed within the annular space confined between the outer and the inner tube, and a power source arranged to supply alternating current to the induction coil in order to generate an alternating magnetic field within at least a part of the inner tube.

15 Claims, 4 Drawing Sheets

(58) Field of Classification Search
CPC .... B01J 2208/00203; B01J 2208/00407; B01J 2208/00415; B01J 2208/024; B01J 2208/026; B01J 2208/027; B01J 2208/00495

See application file for complete search history.

(56) References Cited

U.S. PATENT DOCUMENTS

| | | | |
|---|---|---|---|
| 5,958,273 | A | 9/1999 | Koch et al. |
| 6,315,972 | B1 | 11/2001 | Mehdizadeh et al. |
| 6,884,368 | B2 * | 4/2005 | Zhdanok ............... B01J 8/025 252/373 |
| 2003/0175196 | A1 | 9/2003 | Blackwell et al. |
| 2010/0213190 | A1 | 8/2010 | Bron et al. |
| 2018/0311630 | A1 * | 11/2018 | Hojlund Nielsen .. C07C 5/3335 |

OTHER PUBLICATIONS

International Search Report (PCT/ISA/210) dated May 31, 2017, by the European Patent Office as the International Searching Authority for International Application No. PCT/EP2017/057240.

Written Opinion (PCT/ISA/237) dated May 31, 2017, by the European Patent Office as the International Searching Authority for International Application No. PCT/EP2017/057240.

* cited by examiner

US 11,059,010 B2

INDUCTION HEATED REACTOR

FIELD OF THE INVENTION

Embodiments of the invention generally relate to a tube heat exchange reactor for carrying out an endothermic catalytic reaction as well as the use of the tube heat exchange reactor for carrying out an endothermic catalytic reaction.

BACKGROUND

Performing endothermic reactions will often be challenged by how efficiently heat can be transferred to the reactive zone of the catalyst bed within a reactor unit. Conventional heat transfer by convection, conduction and/or radiation can be slow and will often meet large resistance in many configurations. This challenge can be illustrated with the tubular reformer in a steam reforming plant, which practically can be considered as a large heat exchanger with heat transfer as the rate limiting step. Induction heating is an electrical heating method which may be used to circumvent this challenge, as magnetic fields are able to permeate many materials and therefore may induce magnetic heating directly within the active zone inside a reactor unit.

Induction heating is the process of heating an electrically conducting object (usually a metal) by magnetic induction, through heat generated in the object by eddy currents (also called Foucault currents) and/or hysteresis loss. An induction heater consists of an electromagnet, and an electronic oscillator which passes a high-frequency alternating current (AC) through the electromagnet. The rapidly alternating magnetic field penetrates the object, generating electric currents inside the conductor called eddy currents. The eddy currents flowing through the resistance of the material heat it by Joule heating. Eddy current heating is also denoted ohmic heating. In ferromagnetic (and ferrimagnetic and antiferromagnetic) materials like iron, heat may alternatively or additionally be generated by magnetic hysteresis losses. This is denoted ferromagnetic heating. The frequency of the current used depends on the object size, material type, coupling (between the induction coil and the object to be heated) and the penetration depth. An induction coil comprising a conductor bent into the form of a plurality of loops or windings is an example of an electromagnet.

By induction heating, electrical energy is used to generate a magnetic field which transfers energy from a conducting coil to a ferromagnetic susceptor that is able to absorb electromagnetic energy and convert it to heat. Roughly, the electric energy extracted from the grid will be used in three places: the electronic oscillator, also denoted the power transformer, the coil, and the susceptor. In the oscillator, ohmic heat loss must be expected due to Joule heating. Similarly, Joule heating will enforce an energy loss in the form of heat dissipated from the induction coil. In the susceptor material, electrical energy is transformed into heat by magnetic hysteresis losses. The ohmic heat losses in the oscillator and the induction coil generally result in a lower heat transfer efficiency of the induction heated system.

The current invention describes an induction heating system integrated in a tube heat exchange reactor design where heat loss is minimized.

SUMMARY OF THE INVENTION

Embodiments of the invention generally relate to a tube heat exchange reactor for carrying out an endothermic catalytic reaction. The tube heat exchange reactor comprises an outer tube with a first and a second end, where the first end is an inlet end and where the second end is a closed end. The tube heat exchange reactor further comprises an inner tube coaxially arranged within the outer tube and spaced apart from the outer tube, where at least a part of the inner tube holds a bed of catalyst material susceptible for induction heating and where the inner tube has an inlet end and an outlet end. The tube heat exchange reactor also comprises an induction coil placed within an annular space confined between the outer and the inner tube, and a power source arranged to supply alternating current to the induction coil in order to generate an alternating magnetic field within at least a part of the bed of catalyst material within the inner tube. The tube heat exchange reactor is arranged to allow a process gas stream to be led into the inlet end of the outer tube, to flow in the annular space confined between the outer and inner tube towards the second end of the outer tube and into the inner tube in order to reach the bed of catalyst material and undergo an endothermic reaction resulting in a product gas.

The reactor of the invention is an integrated induction heated reactor where the energy supplied to the induction coil is used effectively for either preheating of process stream or reaction of an endothermic reaction. The reactor involves a bayonet like reactor where the induction coil is placed in the outer tube and the feed gas is used as cooling medium for the coil to receive the Joule heating of the induction coil.

Inside the inner tube, catalyst material susceptible for induction heating is loaded to facilitate the reaction of an endothermic reaction.

Overall, the present invention describes a reactor design where heat loss is minimized. The concept offers optimal heat utilization, where all the electrical energy supplied to the induction heater is used inside the reactor, with the exception of the power loss in the power supply (this will typically be in the order of 5% for good power supplies). An overall energy efficiency of 90-95% is expected.

In an embodiment, the inner tube is arranged to allow heat exchange, during operation, between the process gas flowing in the annular space and the product gas flowing inside the inner tube. Thus, the inner tube has a configuration and is of a material allowing heat exchange between the process gas and the product gas. Thus, product gas stream from the catalyst bed will heat exchange with the feed process stream before leaving the reactor at a relative low temperature. The concept can facilitate all the necessary energy supply for an endothermic reaction, from preheat of the process stream to reaction heat within the bed of catalyst material.

In an embodiment of the invention, the tube heat exchange reformer is designed to provide a pressure difference between the outer and inner tube of up to 5 bar. Since the pressure difference between the inner and outer tube is relatively low, the material of the inner tube may be chosen relatively freely. For example, the inner tube may be of glass or very thin steel.

In an embodiment of the invention, thermal insulation is provided on the outer surface of the outer tube of the tube heat exchange reactor. Hereby, the process heat is kept within the reactor, thus increasing the overall energy efficiency.

In an embodiment of the invention, the induction coil has an extent along a longitudinal axis of the tube heat exchange reactor and wherein thermal insulation is provided along at least a part of the extent of the inner tube between the outer surface of the inner tube and the induction coil.

Hereby, the heat supplied from the inductor is concentrated to the catalyst material.

In an embodiment of the invention, the inner tube is of a magnetically transparent material. Hereby, the inner tube itself is not heated by magnetic hysteresis loss. The inner tube may e.g. be of thin stainless steel or glass. Generally, there are few constraints to the choice of the inner tube material as it is not pressure bearing.

In an embodiment of the invention, the induction coil is constructed of a hollow tube arranged to let an additional stream flow through the hollow tube. Hereby, the additional stream may be heated and/or the induction coil may be cooled. The additional stream may be the process gas which is thus preheated by flowing through the hollow induction coil.

In an embodiment of the invention, the catalyst material susceptible for induction heating comprises a mixture of catalytically active particles and ferromagnetic material. Hereby, the ferromagnetic material is heated by the induction and gives off heat to the catalytically active particles and any gas present in the bed of catalyst material.

In an embodiment of the invention, the ferromagnetic material comprises one or more ferromagnetic macroscopic supports coated with an oxide, and where the oxide is impregnated with said catalytically active particles, said one or more ferromagnetic macroscopic supports being susceptible for induction heating when subject to an alternating magnetic field and wherein said one or more ferromagnetic macroscopic supports are ferromagnetic at least at temperatures up to an upper limit of a given temperature range T. The ferromagnetic material may e.g. be cobalt, iron, nickel, an alnico alloy, a FeCr alloy, Permendur or combinations thereof. The temperature range T is seen as the relevant temperature range of the catalytic reaction. As an example only, the temperature range could be the range between about 400° C. and about 950° C. or a subrange thereof. When the chemical reaction is a steam reforming reaction, generating i.a. hydrogen, the temperature range is typically the range from about 800 to about 950° C., or a sub-range thereof. For example, hydrogen production can be facilitated at 860° C. and 5 bar with a steam to hydrocarbon carbon ratio of 2 using the reactor.

Another example of an endothermic chemical reaction for which the invention is suitable is the tar reforming reaction $C_nH_m + nH_2O \rightleftharpoons nCO + (m/2+n)H_2$, in which case the temperature range is preferably within the range from about 750 to about 950° C. A further example of an endothermic chemical reaction for which the invention is suitable is the reverse water gas shift $CO_2 + H_2 \rightleftharpoons CO + H_2O$, in which case the temperature range is typically within the range from about 400 to about 750° C.

In an embodiment of the invention, the catalytically active particles and a powder of ferromagnetic material are mixed and treated to provide bodies of catalytic mixture, said bodies having a predetermined ratio between catalyst and ferromagnetic material. The ferromagnetic material may e.g. be cobalt, iron, nickel, an alnico alloy, a FeCr alloy, Permendur or combinations thereof.

In an embodiment of the invention, the ferromagnetic material is a porous ferromagnetic material impregnated with said catalytically active particles. This provides for an intimate contact between the catalytically active particles and the ferromagnetic material, providing quick and efficient heating.

In an embodiment of the invention, the ferromagnetic material comprises a plurality of ferromagnetic bodies and wherein said catalytically active particles are impregnated on bodies of catalyst carrier material, said ferromagnetic bodies and said bodies of catalyst carrier material impregnated with catalytically active particles are mixed in a predetermined ratio.

Alternatively, the catalyst material comprises a ferromagnetic nanoparticle component and a catalytically active nanoparticle component on a support. The ferromagnetic nanoparticle component may e.g. comprise cobalt and the catalytically active nanoparticle component may comprise Nickel.

In an embodiment of the invention, the material of the induction coil is chosen between the following: copper, constantan, an iron-chromium-aluminium (FeCrAl) alloy, an alloy of copper, manganese, and nickel, and combinations thereof.

An iron-chromium-aluminum alloy is e.g. sold under the trademark "Kanthal", and an alloy of copper, manganese and nickel is sold under the trademark "Manganin". The examples of the material of the induction coil are advantageous due to their low resistivity and high temperature stability. Other materials which fulfil these requirements could also be considered for the application.

In an embodiment of the invention, the annular space confined between the outer and inner tube comprises catalyst material.

Another aspect of the invention relates to the use of a tube heat exchange reactor according to the invention for carrying out endothermic reactions. This could be one or more of the following reactions: steam reforming, dehydrogenation of alkanes, hydrogen cyanide production, cracking of hydrocarbons, methanol cracking and ammonia cracking.

BRIEF DESCRIPTION OF THE DRAWINGS

Embodiments of the present invention are explained, by way of example, and with reference to the accompanying drawings. It is to be noted that the appended drawings illustrate only examples of embodiments of this invention and are therefore not to be considered limiting of its scope, for the invention may admit to other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention.

Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention.

Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1:
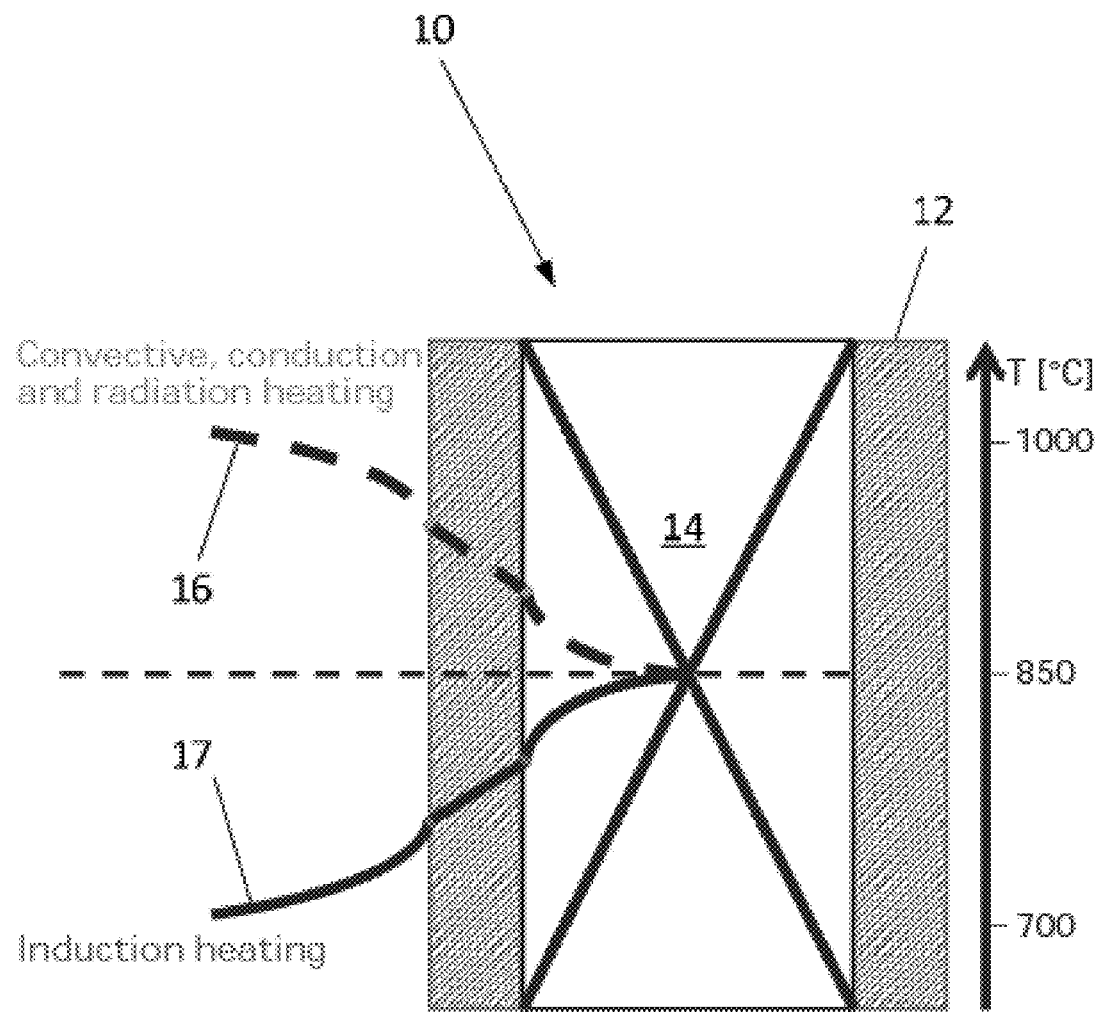
FIG. 1 is a graph showing temperature profiles of a reactor unit heated by convective/conductive and/or radiation heating, and induction heating, respectively.

FIG. 1 is a graph showing temperature profiles of a reactor unit 10 heated by convective/conductive and/or radiation heating, and induction heating, respectively, during an endothermic reaction within the reactor unit 10. The temperature profiles in FIG. 1 are indicated together with a schematic cross-section through a reactor unit 10 having walls 12 holding a catalyst bed 14 with catalyst material for endothermic reactions. The catalyst material in the catalyst bed 14 is susceptible to inductive heating. Means for heating the reactor unit 10 and/or the catalyst bed 14 are not shown. In the case of convective, conduction and/or radiation heating, the means for heating could e.g. be fired burners; means for induction heating would typically be an electromagnet, e.g. an induction coil. A temperature scale is indicated at the right side of FIG. 1. The horizontal dotted line indicates a temperature of 850° C. at the centre of the catalyst bed.

The dotted curve 16 indicates the temperatures outside the reactor unit, at the reactor unit walls as wells as within the catalyst bed 14 when heated by convective/conductive and/or radiation heating, whilst the solid curve 17 indicate the temperatures outside the reactor unit, at the reactor unit walls as well as within the catalyst bed 14 when heated by convective/conductive and/or radiation heating, and induction heating, respectively.

It is clear from FIG. 1, that in the case of convective/conductive and/or radiation heating, the temperature is higher outside the wall 12 than within the wall 12, and that the temperature within the catalyst bed 14 is lower than that at the wall 12. At the center of the catalyst bed, the temperature is at its lowest. This is because the temperature at the heat source must be higher than the reaction zone and due to the temperature loss through the walls and due to the endothermic nature of the reaction within the reactor unit 10. In contrast, the temperature profile as indicated by the curve 17 shows that for induction heating the temperature is higher at the wall 12 compared to outside the reactor unit, whilst the temperature inside the catalyst bed increases from the wall 12 to the center of the catalyst bed 14.

In general, performing endothermic reactions is limited by how efficient heat can be transferred to the reactive zone of the catalyst bed 14. Conventional heat transfer by convection/conduction/radiation can be slow and will often meet large resistance in many configurations. Moreover, heat losses within the walls of the reactor play a role. In contrast, when heat is deposited inside the catalyst bed 14 by the induction concept, the catalyst bed will be the hottest part of the reactor 10 in contrast to conventional heating where the exterior heat source has to be significantly hotter than the internal part to have a driving mechanism for the heat transfer. In addition to the possibility of delivering heat directly to the catalyst material, induction heating offers a fast heating mechanism, which potentially could make upstart of an endothermal chemical reaction relatively fast.

Figure 2:
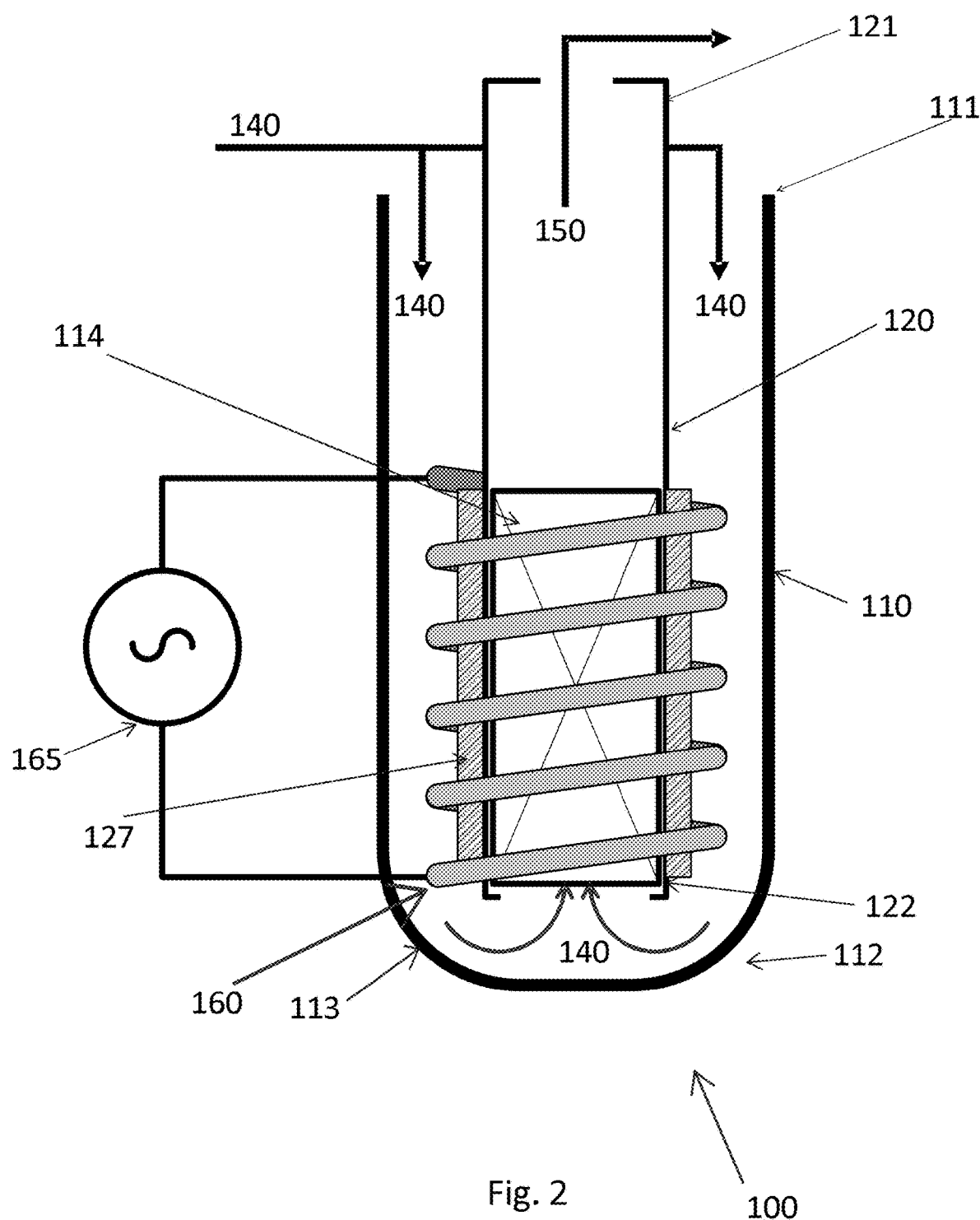
FIGS. 2, 3 and 4 show schematic drawings of embodiments of a tube heat exchange reactor of the invention.
Figure 3:
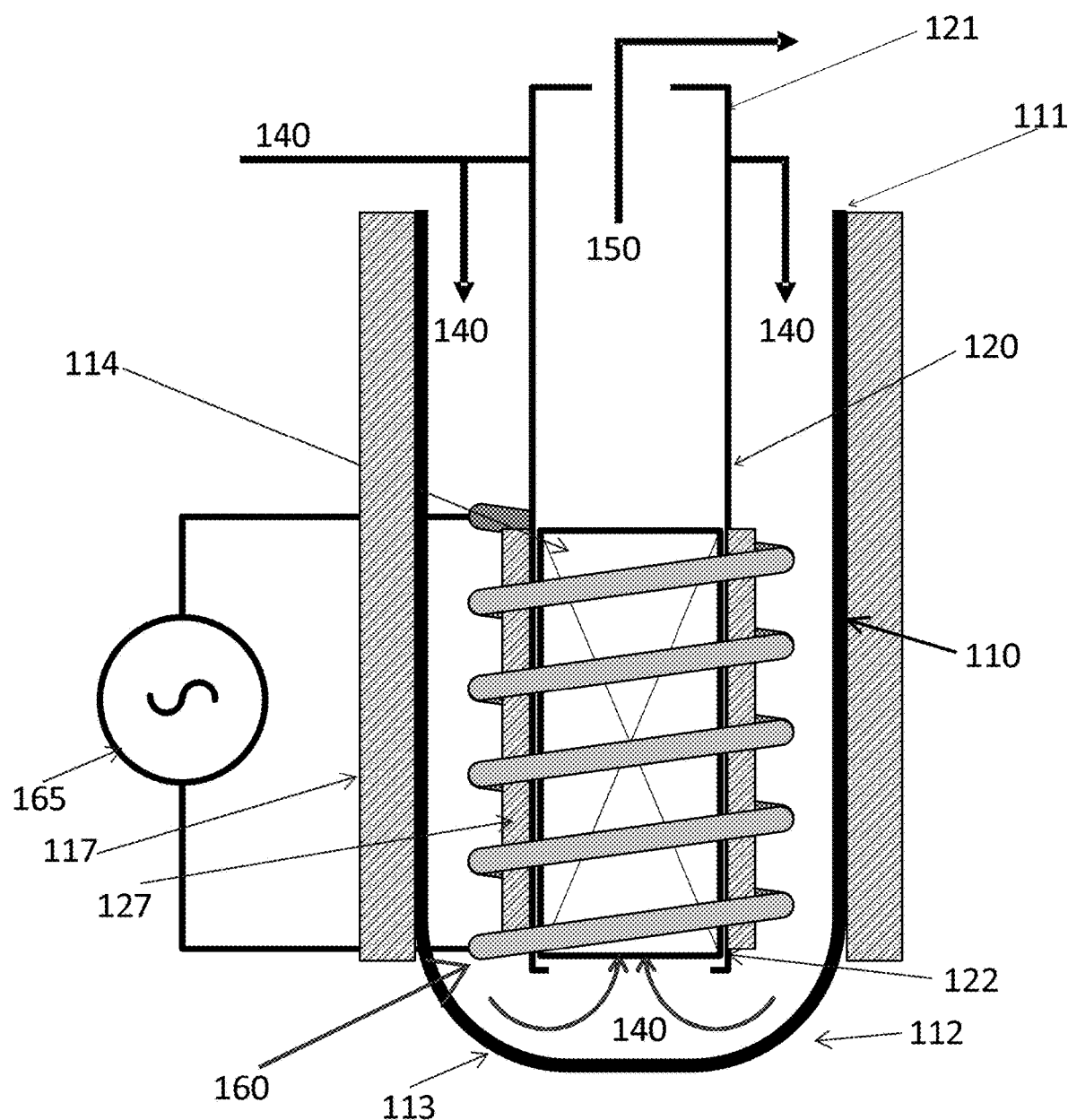
Figure 4:
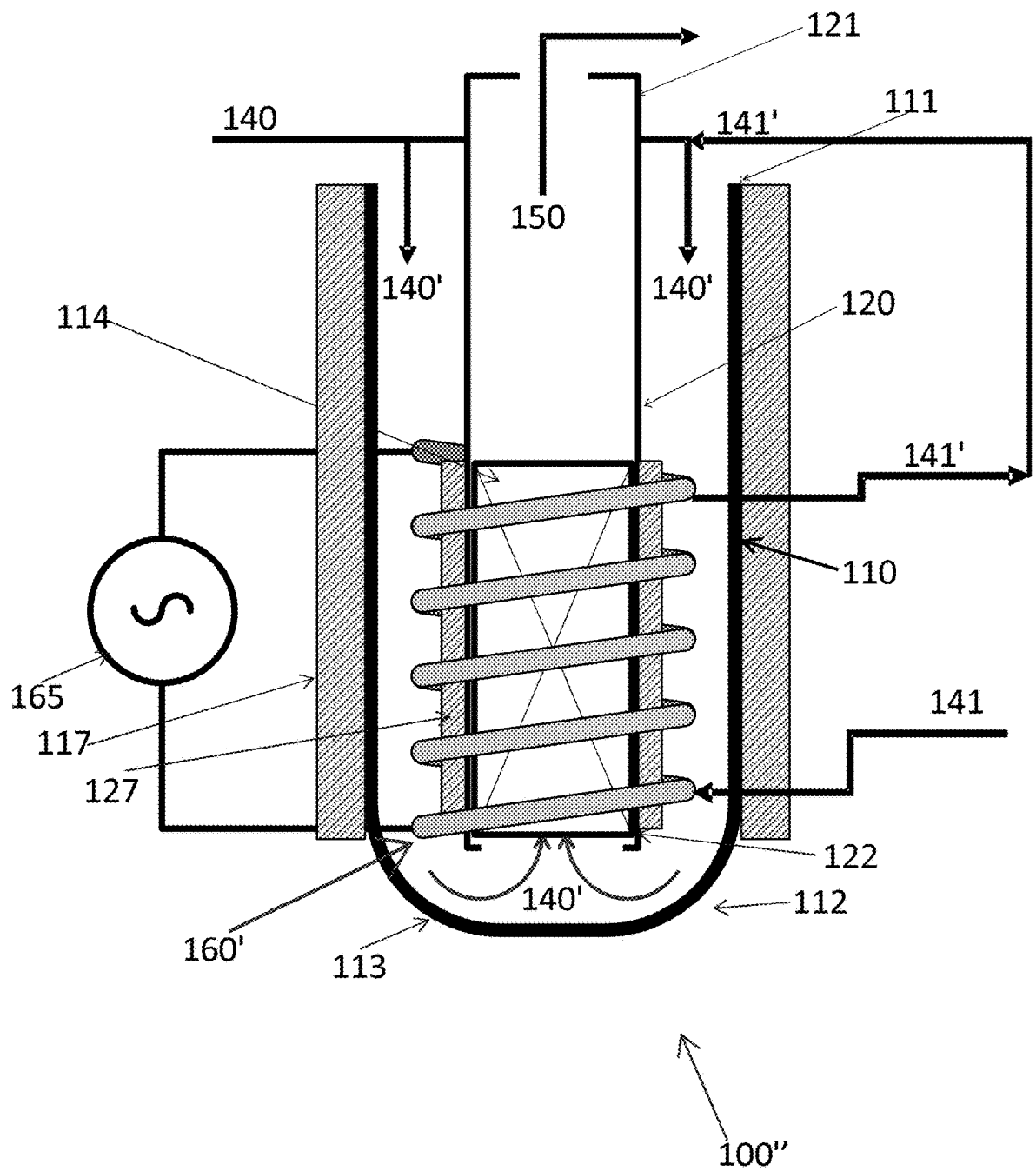

FIGS. 2, 3 and 4 show schematic drawings of embodiments of a tube heat exchange reactor of the invention. In FIGS. 2, 3 and 4, similar features are denoted using similar reference numbers.

FIG. 2 is a partly cross sectional view of a tube heat exchange reactor 100 according to an embodiment of the invention. The tube heat exchange reactor 100 is suitable for carrying out an endothermic catalytic reaction. The tube heat exchange reactor 100 comprises an outer tube 110 with a first end 111 and a second end 112, where the first end 111 is an inlet end and the second end 112 is a closed end. In FIG. 2, the second end is shown as having rounded off edges 113.

An inner tube 120 is arranged coaxially within the outer tube 120 and spaced apart from the outer tube. The inner tube 120 has an inlet end 122 close to the second end 112 of the outer tube, and an outlet end 121 relatively close to the first end 111 of the outer tube.

At least a part of the inner tube 120 holds a bed of catalyst material 114 susceptible for induction heating. An induction coil 160 is placed within the annular space confined between the outer tube 110 and the inner tube 120, i.e. on the outside of the inner tube 120 and within the outer tube 110. A power source 165 is arranged to supply alternating current to the induction coil in order to generate an alternating magnetic field within the part of the inner tube that contains the bed 114 of catalyst material.

The tube heat exchange reactor 100 is arranged to allow a process gas stream 140 to be led into the inlet 111 end of the outer tube 110 and to flow in the annular space confined between the outer tube 110 and inner tube 120 towards the second end 112 of the outer tube 110. During operation of the tube heat exchange reactor 100, the process gas stream 140 undergoes preheating during its passage from the inlet 111 of the outer tube to the inlet 122 of the inner tube. The preheating is both due to heat exchange along the upper part of the inner and outer tubes (as seen in the direction of FIG. 2) between the process gas stream 140 in the annular space between the inner and outer tubes and due to heat exchange when the process gas stream passes the induction coil 160.

When the process gas stream 140 reaches the bottom of the outer tube, it is led into the inner tube 120, where it continues upwards and reaches the bed of catalyst material 114 susceptible for induction heating. In the bed of catalyst material, the process gas stream 140 undergoes an endothermic reaction resulting in a product gas 150. The chemical reaction takes place within the bed of catalyst material 114.

It should be noted, that the direction of the flows is not limited to that shown in FIG. 2. The reactor 100 could be turned e.g. upside down if an upwards flow in the catalyst bed is unwanted.

Thermal insulation 127 is provided along a part of the inner tube 120, viz. the part of the inner tube 120 covered by the induction coil 160. The thermal insulation 127 is positioned between the outer surface of the inner tube 120 and the induction coil 160. It should be noted, that the thermal insulation 127 does not necessarily have to extend along the whole of the longitudinal extent of the induction coil 160. The thermal insulation 127 provides isolation between the induction coil 160 and the inner tube, so that the heating of the catalyst bed 114 is confined to this region.

FIG. 3 is a partly cross sectional view of a tube heat exchange reactor 100' according to an embodiment of the invention. The difference between the tube heat exchange reactor 100 of FIG. 2 and the tube heat exchange reactor 100' as shown in FIG. 3 is that the latter includes thermal insulation 117 on the outer surface of the outer tube 110 of the tube heat exchange reactor 100'. This thermal insulation 117 on the outer surface of the outer tube 110 assists in reducing heat losses from the heat exchange reactor to the surroundings. This insulation layer can also be applied to the bottom of 112/113; however, this is not illustrated in the figures.

FIG. 4 is a partly cross sectional view of a tube heat exchange reactor 100" according to an embodiment of the invention. The difference between the tube heat exchange reactor 100' of FIG. 3 and the tube heat exchange reactor 100" as shown in FIG. 4 is that the induction coil 160' of the tube heat exchange reactor 100" of FIG. 4 is constructed of a hollow tube arranged to let an additional stream flow through the hollow tube. In FIG. 4, an additional stream 141 of process stream is led into the hollow tube of the induction coil 160' in the lower part of the induction coil 160' and is passed through the major part of the induction coil 160', exiting from the upper part thereof as pre-heated process stream 141'. This pre-heated process stream 141' is added to the process stream 140 in order to provide a process stream 140' that is mixed between the process stream 140 and the pre-heated additional stream 141'. Alternatively, 141' is used outside the tube heat exchange reactor 100", e.g. at another place in a chemical plant in which the reactor the invention is a part. The arrangement of the tube heat exchange reactor 100" assists in utilization of the energy in the system.

As an example, the tube heat exchange reactor may be used to perform steam methane reforming. A process gas of methane and water in a ratio of 1:2 is fed into the outer tube of a tube heat exchange reactor at about 150° C. and 5 barg. In the outer channel, the process gas is heated to about 550° C. from product gas in the inner tube and the induction coil, before it enters the catalyst bed. The gas is heated to about 850° C. in the catalyst bed by induction heating, and the reactions are equilibrated with an approach to equilibrium of 10° C. The product gas exchanges heat with process gas before leaving the reactor at a temperature of about 450° C. As an example only, the produced gas has a dry gas composition of 76% $H_2$, 19% CO, 4% $CO_2$, and 1% $CH_4$.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the scope of applicant's general inventive concept.

The invention claimed is:

1. A tube heat exchange reactor for carrying out an endothermic catalytic reaction, said tube heat exchange reactor comprising:
    an outer tube with a first and a second end, where the first end is an inlet end and where the second end is a closed end;
    an inner tube coaxially arranged within the outer tube and spaced apart from the outer tube, where at least a part of said inner tube holds a bed of catalyst material susceptible for induction heating and where said inner tube has an inlet end and an outlet end;
    an induction coil placed within an annular space confined between the outer and the inner tube; and
    a power source arranged to supply alternating current to the induction coil in order to generate an alternating magnetic field within at least a part of said bed of catalyst material within said inner tube,
    wherein said tube heat exchange reactor is arranged to allow a process gas stream to be led into the inlet end of said outer tube, to flow in the annular space confined between the outer and inner tube towards the second end of the outer tube and subsequently into said inner tube in order to reach said bed of catalyst material and undergo an endothermic reaction resulting in a product gas, and
    wherein the catalyst material comprises a ferromagnetic nanoparticle component and a catalytically active nanoparticle component on a support.

2. The tube heat exchange reactor according to claim 1, where said inner tube is arranged to allow heat exchange, during operation, between the process gas flowing in the annular space and the product gas flowing inside the inner tube.

3. The tube heat exchange reactor according to claim 1, wherein the tube heat exchange reactor is designed to provide a pressure difference between the outer and inner tube of up to 5 bar.

4. The tube heat exchange reactor according to claim 1, wherein thermal insulation is provided on the outer surface of the outer tube of the tube heat exchange reactor.

5. The tube heat exchange reactor according to claim 1, wherein said induction coil has an extent along a longitudinal axis of the tube heat exchange reactor and wherein thermal insulation is provided along at least a part of the extent of the inner tube between the outer surface of the inner tube and the induction coil.

6. The tube heat exchange reactor according to claim 1, wherein the inner tube is of a magnetically transparent material.

7. The tube heat exchange reactor according to claim 1, wherein the induction coil is constructed of a hollow tube arranged to let an additional stream flow through the hollow tube.

8. The tube heat exchange reactor according to claim 1, wherein said catalyst material susceptible for induction heating comprises a mixture of the catalytically active nanoparticle component and the ferromagnetic nanoparticle component.

9. The tube heat exchange reactor according to claim 1, wherein said catalyst material comprises one or more ferromagnetic macroscopic supports coated with an oxide, and where the oxide is impregnated with said catalytically active nanoparticle component, wherein said one or more ferromagnetic macroscopic supports being susceptible for induction heating when subject to an alternating magnetic field, and wherein said one or more ferromagnetic macroscopic supports are ferromagnetic at least at temperatures up to an upper limit a given temperature range T.

10. The tube heat exchange reactor according to claim 8, wherein said catalytically active nanoparticle component and a powder of the ferromagnetic nanoparticle component are mixed and treated to provide bodies of catalytic mixture, said bodies having a predetermined ratio between the catalyst and ferromagnetic components.

11. The tube heat exchange reactor according to claim 8, wherein said ferromagnetic nanoparticle component is a porous ferromagnetic material impregnated with said catalytically active nanoparticle component.

12. The tube heat exchange reactor according to claim 8, wherein said ferromagnetic nanoparticle component comprises a plurality of ferromagnetic bodies and wherein said catalytically active nanoparticle component is impregnated on bodies of catalyst carrier material, said ferromagnetic bodies and said bodies of catalyst carrier material impregnated with catalytically active nanoparticles are mixed in a predetermined ratio.

13. The tube heat exchange reactor according to claim 1, wherein the material of the induction coil is chosen between the following: an iron-chromium-aluminium (FeCrAl) alloy, an alloy of copper, manganese, and nickel, copper, constantan, tungsten and combinations thereof.

14. The tube heat exchange reactor according to claim 1, wherein the annular space confined between the outer and inner tube comprises catalyst material.

15. A method of using the tube heat exchange reactor according to claim 1 for carrying out one or more of the following reactions: steam reforming, dehydrogenation of alkanes, hydrogen cyanide production, cracking of hydrocarbons, methanol cracking and ammonia cracking.

* * * * *